(12) United States Patent
Dirksmeier et al.

(10) Patent No.: US 8,881,840 B2
(45) Date of Patent: Nov. 11, 2014

(54) FIRE PROTECTION DEVICE FOR RAIL VEHICLES

(75) Inventors: Roger Dirksmeier, Menden (DE); Max Lakkonen, Sastamala (FI); Dirk Sprakel, Köln (DE)

(73) Assignee: FOGTEC Brandschutz GmbH & Co. KG, Köln (DE)

( * ) Notice: Subject to any disclaimer, the term of this patent is extended or adjusted under 35 U.S.C. 154(b) by 524 days.

(21) Appl. No.: 13/262,299

(22) PCT Filed: Mar. 26, 2010

(86) PCT No.: PCT/EP2010/053979
§ 371 (c)(1),
(2), (4) Date: Oct. 28, 2011

(87) PCT Pub. No.: WO2010/112415
PCT Pub. Date: Oct. 7, 2010

(65) Prior Publication Data
US 2012/0037383 A1    Feb. 16, 2012

(30) Foreign Application Priority Data

Apr. 3, 2009   (DE) .................. 10 2009 016 144
May 8, 2009   (DE) .................. 10 2009 020 375

(51) Int. Cl.
| | | |
|---|---|---|
| *A62C 3/00* | (2006.01) | |
| *A62C 3/07* | (2006.01) | |
| *A62C 3/08* | (2006.01) | |
| *A62C 31/22* | (2006.01) | |
| *B61D 17/20* | (2006.01) | |
| *B60D 5/00* | (2006.01) | |
| *B61D 17/22* | (2006.01) | |
| *A62C 99/00* | (2010.01) | |

(52) U.S. Cl.
CPC . *B61D 17/20* (2013.01); *A62C 3/07* (2013.01); *B60D 5/00* (2013.01); *A62C 99/0072* (2013.01); *B61D 17/22* (2013.01)
USPC .................... 169/62; 169/54; 169/55; 169/70

(58) Field of Classification Search
USPC .............................. 169/13, 51, 54, 55, 62, 70
See application file for complete search history.

(56) References Cited

U.S. PATENT DOCUMENTS 1,962,977 A * 6/1934 Whitsitt ......................... 169/56
6,263,974 B1 * 7/2001 Sundholm ....................... 169/62

(Continued)

FOREIGN PATENT DOCUMENTS

| CN | 2676958 | 2/2005 | ............. A62C 35/64 |
| DE | 4123584 | 1/1993 | ............... B61D 3/18 |

(Continued)

OTHER PUBLICATIONS

State Intellectual Property Office of P.R.C., Office Action, Application No. 201080014627.2, dated Feb. 8, 2014, 6 pages.
State Intellectual Property Office of P.R.C., English translation: Office Action, Application No. 201080014627.2, dated Feb. 8, 2014, 8 pages.

(Continued)

*Primary Examiner* — Ryan Reis
(74) *Attorney, Agent, or Firm* — Sunstein Kann Murphy & Timbers LLP

(57) ABSTRACT

Fire protection device for gangways 3 between the coaches 2 of rail vehicles with a gangway 3 between coaches 2 of a rail vehicle, and a fluid-fed fire-fighting device. Effective firefighting with low weight is made due to the fact the firefighting device comprises a fluid mist nozzle 4 which delivers a fluid mist, whereby the at least one fluid mist nozzle 4 is arranged in such a way that the fluid mist is sprayed into the gangway 3.

12 Claims, 3 Drawing Sheets

(56) References Cited

U.S. PATENT DOCUMENTS

Figure 1:
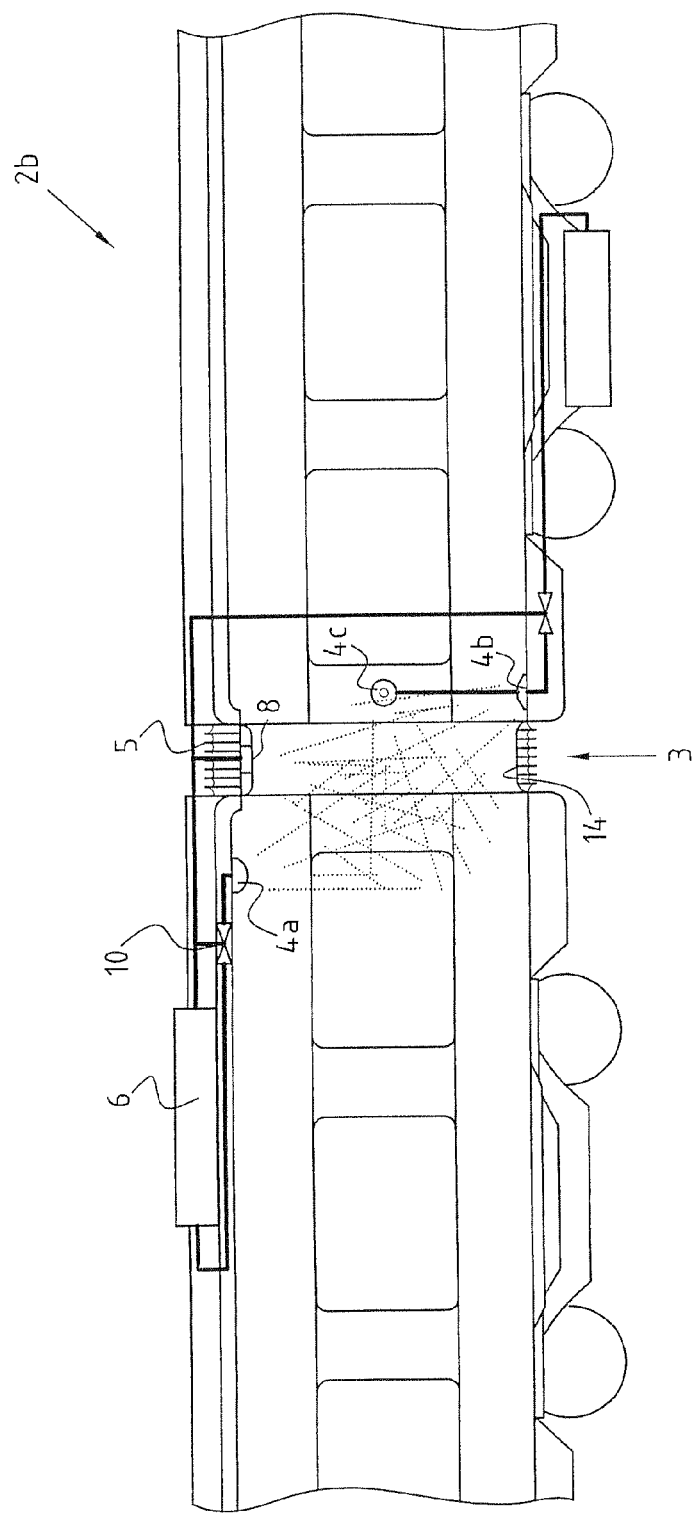

| | | | |
|---|---|---|---|
| 7,975,621 B2* | 7/2011 | Gibson | 105/238.1 |
| 8,590,631 B2* | 11/2013 | Sprakel et al. | 169/55 |

FOREIGN PATENT DOCUMENTS

| | | | | |
|---|---|---|---|---|
| EP | 0522671 | | 1/1993 | B61D 3/18 |
| EP | 1419804 | | 5/2004 | A62C 3/07 |
| EP | 2105326 | | 9/2009 | B60D 5/00 |
| EP | 2105326 | A1 * | 9/2009 | |
| GB | 2215204 | | 9/1989 | A62C 35/00 |
| GB | 2354943 | | 1/2000 | A62C 3/00 |

OTHER PUBLICATIONS

International Searching Authority, International Search Report—International Application No. PCT/EP2010/053979, dated Jul. 29, 2010, together with the Written Opinion of the International Searching Authority, 14 pages.

Cohausz & Florack, Translation of International Preliminary Report on Patentability, International Application No. PCT/EP2010/053979, 10 pages, undated.

State Intellectual Property Office of P.R.C., Office Action, Application No. 201080014627.2, dated Jun. 9, 2013, 3 pages.

State Intellectual Property Office of P.R.C., English translation: Office Action, Application No. 201080014627.2, dated Jun. 9, 2013, 5 pages.

* cited by examiner

FIRE PROTECTION DEVICE FOR RAIL VEHICLES

The subject matter relates to a fire protection device for gangways between the coaches of rail vehicles with a gangway between two coaches of a rail vehicle, and a fluid-fed fire-fighting device.

Due to the provisions of the law, the capacity for fighting fires in public passenger transport is constantly gaining in importance. In rail transport in particular, fire-fighting capacity is of high importance. Several hundreds of passengers are transported in the coaches of rail vehicles. More recent rail vehicles have open gangways between the coaches. This results in very substantial spaces in which fire can spread rapidly. In addition the passengers carry easily flammable materials with them (e.g. items of clothing, bags, etc.), and fire can spread extremely rapidly due to these easily ignitable materials.

In particular against the background of the gangways between two coaches, it can happen that a fire in one coach spreads to a neighbouring coach. As already mentioned, more recent rail vehicles have open gangways which are frequently designed as gangway bellows. The gangways accordingly no longer constitute natural fire protection barriers. Moreover, the gangways themselves constitute fire loads. In particular, the cladding of the ceilings, walls, and floors of the gangways, as well as the bellows elements themselves, are frequently made of plastic, such as PVC. If these plastic burn, toxic gases are incurred, which can be life-threatening. If the gangways are formed from other, fire-inhibiting materials, production costs are increased enormously. This leads to extremely expensive gangways, for which the customers for rail vehicles, such as the railway network operators, are unwilling to pay.

Finally, the gangways between the coaches frequently represent the only emergency escape routes which the passengers can use in order to evacuate the area of a fire. Thus closing off these escape routes with a fire protection door is excluded, since otherwise the passengers would be trapped in the area of a fire.

For this reason, the object of the invention is to provide a fire protection device for gangways of coaches which is economical, has good fire protection properties, and at the same time increases passenger safety. This object is achieved according to the subject-matter in that the fire-fighting device comprises at least one fluid mist nozzle which delivers a fluid mist, wherein the at least one fluid mist nozzle is arranged in such a way that the fluid mist is sprayed into the gangway.

By contrast with conventional sprinkler systems which require enormous volumes of water and which for this reason cannot be used in rail vehicles due to the high weights involved, fluid mist systems are particularly well-suited for fire-fighting in rail vehicles. The fluid mist nozzles emit the fluid in very fine droplets. In this case, droplet sizes of between 20 and 200 µm in diameter are usual. The fluid mist nozzles are frequently fed with a fluid under high pressure. In this case, it is possible, for example, for a pressure range of between 10 and 60 bar to be used. It is also possible to use a pressure range between 60 and 200 bar. A pressure range can also even begin at 5 bar. The delivery of the fluid under high pressure causes a very fine atomization of the fluid at the fluid mist nozzle, as a result of which the area of the fire is cooled. In addition, the fluid mist leads to the formation of a fluid mist curtain, by means of which toxic gases can at least in part be washed out. The fluid mist is therefore suitable as a delimitation between two areas, inasmuch as the fluid mist, as a mist haze, forms a curtain through which a fire cannot penetrate.

Since, as indicated in the preamble, the spread of the fire from one coach into the next should be prevented, the fluid mist nozzle according to the invention is arranged in such a way that the fluid mist is sprayed into the gangway. Hereby, the gangway by means of the fluid mist forms a fire barrier, through which the fire and the combustion gases cannot pass. The combustion gases are at least in part washed out and precipitated by the fluid mist.

The materials of the gangway are protected against fire by the fluid mist, since, in the event of activation of the fire-fighting device, the gangway is always cooled by the fluid mist.

Finally, a small number of fluid mist nozzles in the area of the gangway are sufficient to cool it sufficiently. In addition, the fluid mist nozzles require only a small quantity of fluid, such as water, in order to produce the fluid mist. It is possible, for example, for a fluid mist to be sustained for 10 minutes with 100 liters of water. Smaller quantities of water are likewise possible. It has been found that the weight saving in comparison with conventional fire protection devices is enormous. By contrast with additional weights of 300 to 400 kg for fire protection doors, the fire-fighting device according to the invention, including the fluid storage, requires a weight of approximately 100-150 kg in order to attain the same fire protection class.

Moreover, the persons who are present in a coach in which a fire has broken out can pass through the fluid mist into an adjacent coach, and thus protect themselves from the fire. Elaborate mechanical arrangements for a fire protection door are not required.

According to an embodiment, it is proposed that the fluid mist nozzle is arranged in at least one coach in the area of the gangway, and a spray device of the fluid mist is arranged in the direction of the gangway. According to this example, the fluid mist nozzle is arranged in the coach itself. The fluid mist nozzle in the coach is arranged in such a way that the fluid mist is sprayed in the direction of the gangway. For this purpose, either a fluid mist nozzle designed for this purpose is used, which has nozzle inserts which are arranged in the direction of the gangway, or the fluid mist nozzle can be arranged as a whole in the direction of the gangway. The predominant part of the fluid mist can thereby be sprayed into the gangway. Hereby, for example, more than 20-90% of the fluid droplets reach the gangway.

According to an embodiment, it is also proposed that the fluid mist nozzle is arranged in the gangway. The arrangement of the fluid mist nozzle in the gangway has the advantage, on the one hand, that the fluid mist is produced directly in the gangway. In addition, the gangway can be constructed together with the fluid mist nozzle, whereby the fluid mist nozzle already comprises an integrated fire-fighting device. The coaches in which the gangway designed in this manner is incorporated do not have to be designed in any special way. Thus, a combination is possible between a gangway arranged in this manner and the most varied types of coach, whereby a fire-fighting arrangement is guaranteed at all times.

According to an embodiment, the fluid mist nozzle is arranged in the floor area of the gangway. The gangway is formed in the conventional manner from a flexible outside part, which is delimited into the interior by interior cladding elements. The interior cladding elements can be displaced against one another, such that the gangway remains flexible. In the area of the floor, for example, floor plates can be arranged, which can be displaced against one another. The fluid mist nozzle can be arranged, for example, beneath these floor plates in mounts provided for this purpose. The fluid mist nozzles can be protected in the floor area by cover plates.

The fluid mist nozzles can be designed in such a way that, in the event of activation of the fire-fighting device, they cause the cover plates to be released, and spray the fluid mist into the gangway. In this case, the cover can, for example, be released from an anchoring arrangement by the fluid mist itself, which is provided from the fluid mist nozzles.

It is also proposed that the fluid mist nozzle is arranged in the side walls of the gangway. The side walls are also frequently arranged so as to be visually attractive by means of cladding elements. In these cladding elements the fluid mist nozzles can be arranged in indentations provided for this purpose. In this case, it is also possible for the fluid mist nozzles to be arranged behind covers. In the event of activation of the fluid mist nozzles, the covers can be released from the anchor points, for example, by a movement of the fluid mist nozzle or by the fluid mist itself.

According to an embodiment, it is also proposed that the fluid mist nozzle is arranged in a ceiling area of the gangway. As well as the floor and side areas, the ceiling area can also be covered by a cladding. The fluid mist nozzles can be arranged inside this cladding. The fluid mist nozzles can in this case too be arranged in mounts, and covered by covers, such that under normal circumstances they cannot be seen. It is only in the event of activation that the cover is released from an anchoring arrangement.

One particularly economical solution can be achieved in that the fire-fighting device comprises a central fluid storage. For example, it is possible for a central fluid storage to be provided in a coach which feeds the fluid mist nozzles of the coach as well as the fluid mist nozzles of the gangway. It is also possible for a central fluid storage to be provided in the rail vehicle, which feeds all the fluid mist nozzles inside the rail vehicle and thus inside all or a large number of the coaches.

A further aspect which is already independently based on an inventive idea consists of the concept that, in the event of the activation of a fluid mist nozzle in a first area, the activation of a fluid mist nozzle in an adjacent area takes place. For example, a fire is detected in a first coach, whereupon at least all the fluid mist nozzles in the coach concerned are activated. In addition, by means of an appropriate valve control arrangement, as well as the fluid mist nozzles in the coach in which the fire has broken out, the fluid mist nozzles of the gangway adjacent to this coach can be activated. It is also possible for the nozzles of adjacent coaches to be activated which are immediately facing the gangway which is closest to the fire. For example, an activation is possible of all the fluid mist nozzles in the coach in which the fire has taken hold and, at the same time, the automatic activation of the nozzles in the gangways adjacent to this coach. Further nozzles can also be activated, which are arranged in the adjacent coaches. It is possible, for example, that only the nozzles of the adjacent coach are activated which are assigned to the gangway, or which are located close to the gangway. It is also possible that, in the event of an activation of the nozzles in a gangway, the nozzles in the adjacent coach are activated, or at least the nozzles which are closest to the gangway. A valve control system can, for example, be coupled to a fire detection system. It is also possible for fluid to be released into the areas accordingly, by means of non-return valves. The features of this independent inventive thinking can be combined with all the features of the fire-fighting arrangement described heretofore.

When using a central fluid storage, care must be taken to ensure that only the fluid mist nozzles are activated which are in the area of the fire. For this reason, a local method of fire detection should be ensured. According to an embodiment, it is therefore proposed that the fire-fighting device should have fire detection means for detecting a fire in the gangway. By means of these fire detection means, a fire can be detected separately for each gangway. By means of this detection it is possible for fluid to be delivered to this gangway only, such that only this gangway is subjected to a fluid mist. The fire detection means can be arranged in the gangway.

According to an embodiment, it is also proposed that the fire-fighting device comprises at least one section valve, connecting the fluid mist nozzle to the central fluid storage. This section valve is necessary in order for individual fluid mist nozzles or groups of fluid mist nozzles to be supplied specifically with fluid. If a fire is detected in a gangway or in a coach adjacent to the gangway, the section valve can be opened of the gangway in which the fire has been detected or which is adjacent to the coach in which the fire has broken out, whereupon the fluid mist nozzle(s) of the corresponding gangway are supplied with fluid.

According to an embodiment, it is also proposed that the fire-fighting device comprises a local fluid storage, in such a way that a fluid storage is provided for each gangway. This local arrangement of a fluid storage at the gangway has the advantage that a gangway can be equipped with an integrated fire-fighting device. Such a gangway can be arranged in the coaches of the rail vehicles independently of the fire-fighting devices, and already contains a fire protection barrier. The local fluid storage can be of small dimensions, whereby it is possible, for example, for only a small amount of fluid needing to be stored in each gangway. Since there are only a small number of fluid mist nozzles in one gangway, for example only in the floor, only in the side wall, or only in the roof area, or in a combination of these three areas, only a correspondingly small amount of fluid needs to be carried for a specific duration of fire-fighting.

The fluid storage should be arranged in such a way that it cannot be seen by passenger in the gangway. For this reason, it is proposed that the local fluid storage should be arranged on the floor of the gangway. In this situation, the fluid storage can be arranged, for example, in the underfloor area, outside the passenger area. It is also possible for the fluid storage to be arranged on an outside wall of the gangway, which also makes it easily accessible for maintenance purposes.

It is likewise possible for the local fluid storage to be arranged in the roof area of the gangway. In this case too, the fluid storage can be arranged, for example, above the roof cladding or in the outside area of the gangway. With the arrangement in the outside area in particular, maintenance involves very little effort, since no cladding elements need to be removed in the interior.

According to an advantageous exemplary embodiment, it is also proposed that the fire-fighting device should comprise a pressure pump for conducting the fluid to the fluid mist nozzle. In this case, the pressure pump can be activated in the event of a fire being detected by detection means. The pressure pump thereupon pumps the fluid via a pipe distribution arrangement to the fluid mist nozzle, the section valve of which is opened. The pressure pump can produce pressures of, for example, between 5 and 200 bar. It is also possible for the pressure pump to be a pneumatic pump which is arranged in any event in the rail vehicle. For example, a pneumatic pump is regularly arranged in a railcar of a rail vehicle as a matter of course. In the event of a fire, this can be switched by a valve in such a way that, in the event of a fire, the air pressure which the pump generates is conducted via a pipe to the fluid storage, and there forces the fluid to the fluid mist nozzles.

It is also possible for the fire-fighting device to comprise a high-pressure fluid storage. This can be, for example, a high-pressure cylinder, with a content capacity of 50 liters. This high-pressure cylinder can be filled, for example, ⅔ with fluid and ⅓ with compressed air. In the event of activation, the compressed air drives the fluid out of the high-pressure cylinder. The high-pressure cylinder can, for example, be set under preliminary tension at a high pressure, such as between 50 and 200 bar. A combination of a compressed air cylinder and a fluid storage can also be provided.

Figure 2:
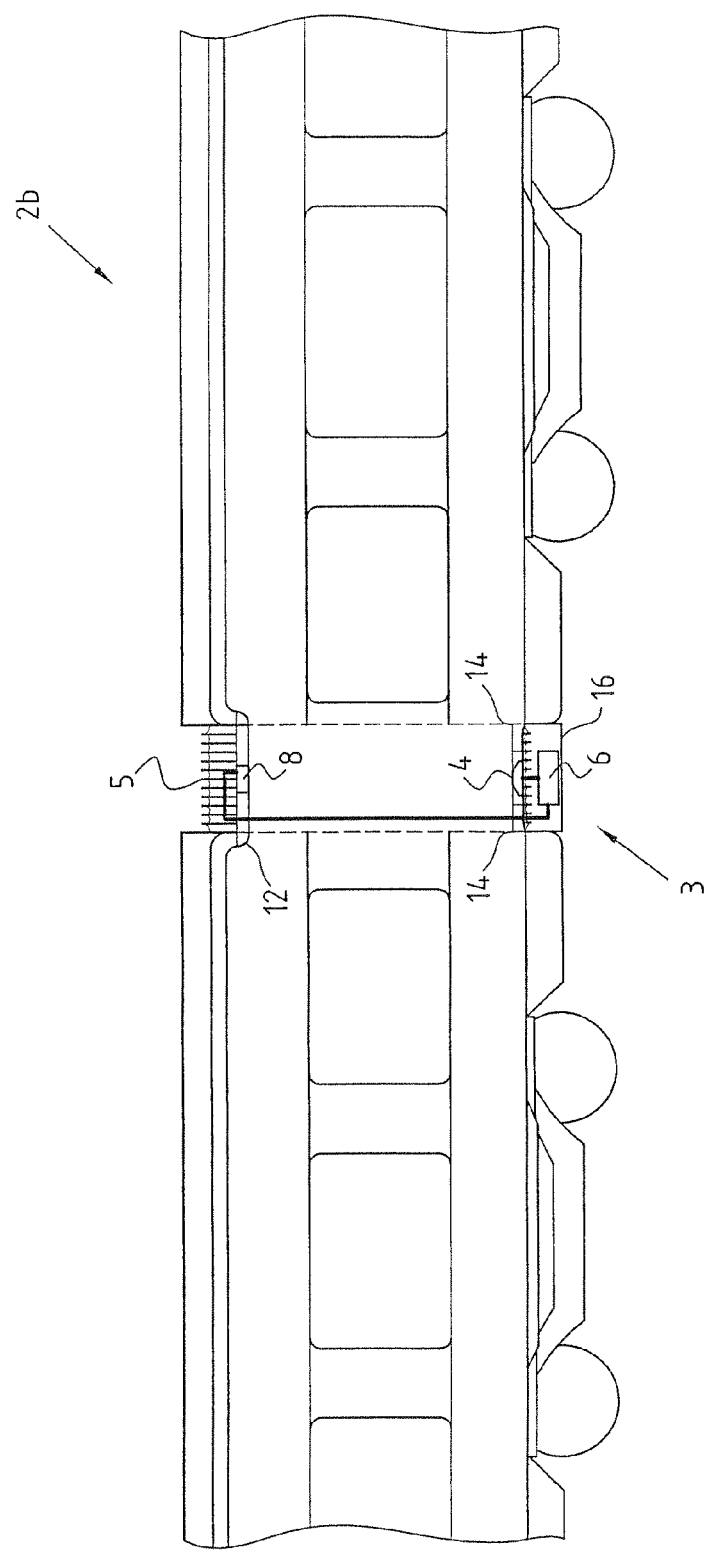
Figure 3:
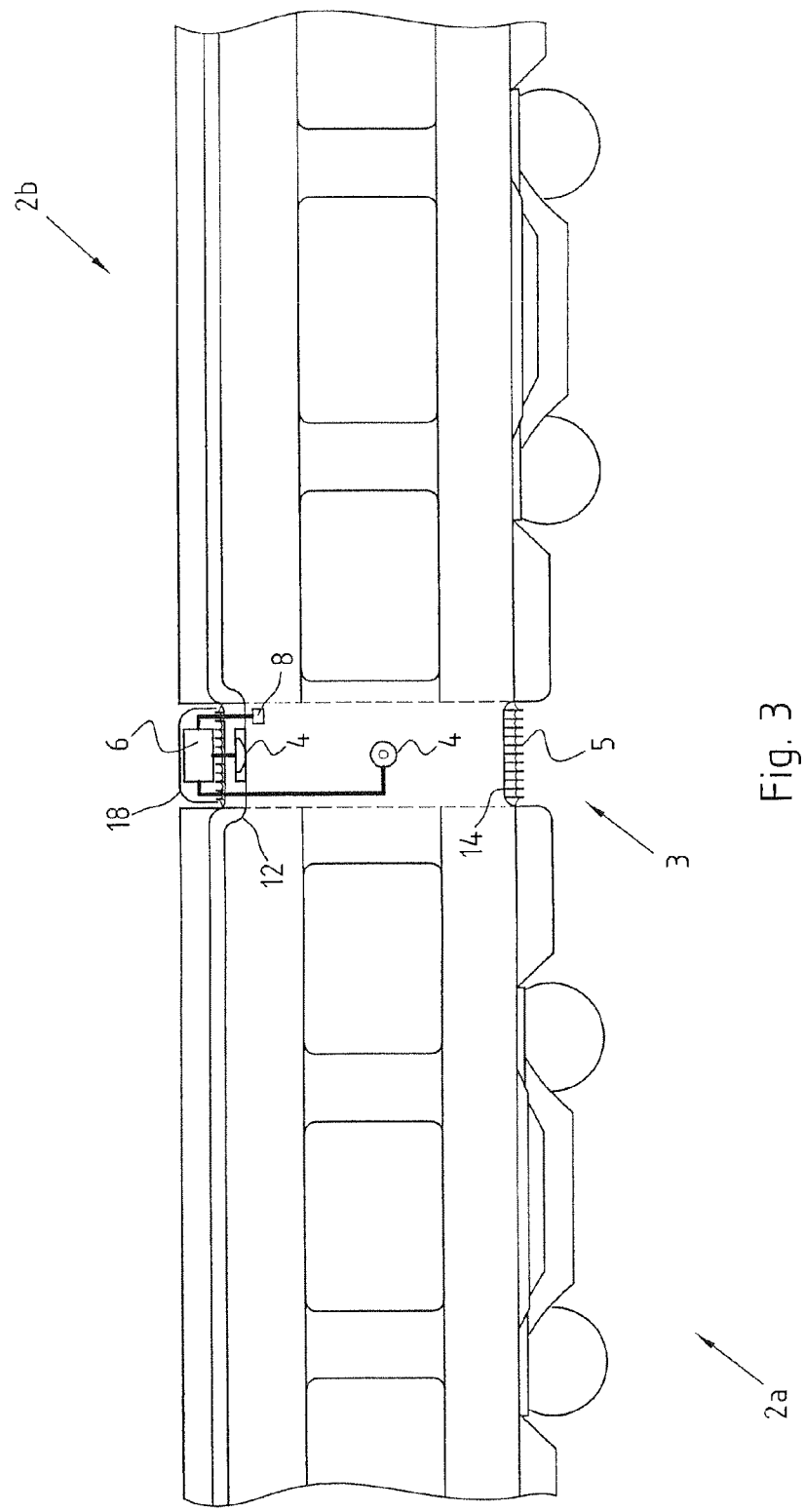

The subject-matter is explained in greater detail hereinafter on the basis of the drawings showing embodiments. The drawings show:

FIG. 1 A schematic view of a first exemplary embodiment;

FIG. 2 A schematic view of a second exemplary embodiment;

FIG. 3 A schematic view of a third exemplary embodiment.

FIG. 1 shows two coaches 2a, 2b of a rail vehicle. The coaches 2a, 2b are separated from one another by a gangway 3. The gangway can be, for example, a gangway bellows arrangement. It is also possible for the gangway 3 to be another form of flexible gangway 3, which connects the coaches 2a, 2b to one another such as to pivot about at least one axis. Shown is a gangway 3 with a bellows arrangement 5.

FIG. 1 shows a fire protection device which has already been activated, with the fire-fighting device comprising fluid mist nozzles 4a, 4b, 4c. The fluid mist nozzles 4a, 4b, 4c are arranged in the coaches 2a, 2b. It can be seen that the fluid mist nozzles 4 spray fluid mist (shown by dotted lines) in the direction of the gangway 3. The fluid mist is sprayed for the most part into the gangway 3. There is substantially no fluid mist sprayed into the coaches 2a, b by the fluid mist nozzles 4.

In the variant shown in FIG. 1, two central fluid storage s 6a, 6b are provided. The fluid storage 6 can be, for example, a high-pressure cylinder. It is also possible for the fluid storage to be equipped with a pressure pump (not shown), which, in the event of activation, drives the fluid via the pipe to the fluid mist nozzles 4.

In the case of a central fluid supply via a fluid storage 6 it is necessary for a fire in a gangway 3 or in the coaches 2a, 2b adjacent to the gangway to be detected by a local fire detection means 8. Detection of a fire in the gangway 3 is notified by the fire detection means 8 by means of a control line both to the fluid storage 6 as well as to the section valves 10. The fluid storage 6 is activated, for example by being opened or by the pump being activated, and, at the same time, the section valves 10 assigned to the fluid mist nozzles 4 are opened. This allows fluid to pass via the pipe and the section valve 10 to the fluid mist nozzles 4.

In FIG. 1, a fluid storage 6a is arranged in the coach 2a. This fluid storage 6a is arranged in the roof area of the coach 2a. The fluid storage 6a can be arranged, for example, on the roof of the coach 2a, so making it easily accessible for maintenance purposes.

The coach 2b is equipped with a fluid storage 6b. The fluid storage 6b can be arranged in the floor area, beneath the coach 2b. The individual central fluid storages are connected to the fluid mist nozzles 4 via pipes. The fluid storage 6a is connected to the fluid mist nozzle 4a. The fluid storage 6b is connected to the fluid mist nozzles 4b, 4c.

FIG. 2 shows a further exemplary embodiment. In the case of the exemplary embodiment shown in FIG. 2, an integrated fire-fighting device is arranged in the gangway 3. The integrated fire-fighting device comprises a fluid storage 6 arranged in the floor 16 of the gangway 3. The fluid storage 6 is arranged outside the passenger area, e.g. in the floor 16 of the gangway 3. Inside the passenger area the gangway 3 is covered by a floor covering 14. Passengers can thus move unhindered from the coach 2a into the coach 2b. In order to avoid the risk of stumbling, the fluid mist nozzle 4 is covered by a cover which closes off flush with the floor covering 14.

In addition, a fire detection means 8 is arranged in a roof area 12, for example in a suspended false roof.

If a fire is detected by the fire detection means 8, this is notified to the fluid storage 6. The fluid storage 6 thereupon supplies the fluid mist nozzle 4 with water, for example. The cover above the fluid mist nozzle 4 is thereupon sprung off by the fluid mist, and a fluid mist is introduced into the gangway 3.

FIG. 3 shows a further exemplary embodiment of a local fire-fighting device. In case of the local fire-fighting device shown in FIG. 3, the fluid storage 6 is arranged on the roof 18 of the gangway 3.

In the variant shown in FIG. 3, two fluid mist nozzles 4a, 4b are arranged in the gangway. A fluid mist nozzle 4a is arranged in the roof area 12 of the gangway 3. Here too, the fluid mist nozzle 4a can be covered by a cover, which is flush with the roof area. The cover is only released in the event of activation.

Moreover, a further fluid mist nozzle 4b is arranged in the gangway 3 in a side wall. This fluid mist nozzle 4b can also be covered, and the cover will not be removed until the fluid storage 6 is activated.

A fire is detected by a fire detection means 8, whereupon the fluid storage 6 is activated and the fluid mist nozzles 4a, 4b emit the fluid mist into the gangway.

By means of the fire protection device according to the subject-matter, it is possible to provide an economical means of fighting fires in the gangways of rail vehicles. The fire protection device according to the invention is very flexible and offers substantially less weight than conventional fire protection devices. By means of the fire protection device according to the invention, gangways for rail vehicles can be integrated from the outset with a fire-fighting device. The legal requirements are hereby fulfilled.

The invention claimed is:

1. A fire protection device arranged for a gangway between coaches of rail vehicles comprising:
   a fire extinguishing fluid fed fire-fighting device,
   wherein the fire-fighting device comprises at least one fluid mist nozzle for delivering a fluid mist,
   wherein the fluid mist nozzle is arranged within the coach in proximity to the gangway,
   the at least one fluid mist nozzle is arranged in such a way that the fluid mist is sprayed into the gangway, so that more than 20-90% of fluid drops of the fluid mist reach the gangway,
   wherein the extinguishing fluid is sprayed at a pressure between 5 and 200 bar.

2. The fire protection device of claim 1, wherein a spray direction of the fluid mist nozzle is arranged from the coach into the direction of the gangway.

3. The fire protection device of claim 1, wherein a further fluid mist nozzle is arranged in the gangway.

4. The fire protection device of claim 3, wherein the fluid mist nozzle is arranged in at least one of:
   A) the floor area of the gangway, or
   B) the side walls of the gangway, or
   C) in a roof area of the gangway.

5. The fire protection device of claim 1, wherein the fire-fighting device comprises a central fluid storage.

6. The fire protection device of claim 5, wherein the fire-fighting device comprises fire detection means assigned to the gangway, for the detection of a fire in the gangway.

7. The fire protection device of claim 5, wherein the fire-fighting device comprises at least one section valve connecting the fluid mist nozzle to the central fluid storage.

8. The fire protection device of claim 7, wherein in the event of activation, the fire detection means actuate the section valve in such a way that the section valve opens.

9. The fire protection device of claim 1, wherein the fire-fighting device comprises a local fluid storage, in such a way that a fluid storage is provided for each gangway.

10. The fire protection device according of claim 9, wherein the local fluid storage is arranged in at least one of
   A) the floor of the gangway, or
   B) the roof area of the gangway.

11. The fire protection device of claim 1, wherein the fire-fighting device comprises a pressure pump conducting the fluid to the fluid mist nozzle.

12. The fire protection device of claim 1, wherein the fire-fighting device comprises a high-pressure fluid storage.

\* \* \* \* \*